United States Patent [19]
Iwai

[11] Patent Number: 5,237,522
[45] Date of Patent: Aug. 17, 1993

[54] PHOTOSENSITIVE SHEET REMAINING AMOUNT DETECTION DEVICE FOR IMAGE FORMING APPARATUS

[75] Inventor: Shougo Iwai, Yamatokoriyama, Japan

[73] Assignee: Sharp Kabushiki Kaisha, Osaka, Japan

[21] Appl. No.: 982,047

[22] Filed: Nov. 25, 1992

Related U.S. Application Data

[63] Continuation of Ser. No. 486,364, Feb. 28, 1990, abandoned.

[30] Foreign Application Priority Data

Mar. 7, 1989 [JP] Japan ................................. 1-54353

[51] Int. Cl.⁵ .............................................. G03B 27/58
[52] U.S. Cl. ..................................... 364/561; 355/309; 377/8
[58] Field of Search ........... 364/561, 471, 562, 464.02; 377/8, 15; 73/159; 340/675; 355/308, 309, 310, 316, 317, 72

[56] References Cited

U.S. PATENT DOCUMENTS

| | | | |
|---|---|---|---|
| 3,145,294 | 8/1964 | Jackson | 364/562 |
| 3,508,035 | 3/1970 | Worthley | 364/471 |
| 3,627,957 | 12/1971 | Kobayashi et al. | 200/61.16 |
| 4,140,897 | 2/1979 | Guerra | 377/15 |
| 4,335,439 | 6/1982 | St. Denis | 364/562 |
| 4,422,402 | 12/1983 | Ogihara | 340/675 |
| 4,503,960 | 3/1985 | Koeleman et al. | 355/309 |
| 4,535,463 | 8/1985 | Ito et al. | 377/8 |
| 4,566,547 | 1/1986 | Furukawa | 355/309 |
| 4,748,479 | 5/1988 | Ohira et al. | 355/72 |
| 4,885,613 | 12/1989 | Kudoh | 355/310 |
| 4,947,472 | 8/1990 | Maeda | 355/72 |
| 5,063,408 | 11/1991 | Khalid et al. | 355/72 |
| 5,065,180 | 11/1991 | Shindo et al. | 355/72 |
| 5,066,973 | 11/1991 | Kuwabara | 355/72 |

FOREIGN PATENT DOCUMENTS

| | | |
|---|---|---|
| 54-112986 | 8/1979 | Japan . |
| 55-143246 | 10/1980 | Japan . |
| 57-115036 | 7/1982 | Japan . |

*Primary Examiner*—Jack B. Harvey
*Assistant Examiner*—Ellis B. Ramirez

[57] ABSTRACT

To indicate a remaining portion of a photosensitive sheet roll of material a method and apparatus are provided. A rotation detector is secured to a rotation system rotatively supporting a photosensitive sheet roll. A measuring device measures the amount of rotation of the photosensitive sheet roll, detected by the rotation detector, within a predetermined time or during a period of one cycle of an image forming process. An indicating device indicates the remaining amount of the photosensitive sheet roll according to the rotation amount measured by the measuring device.

27 Claims, 6 Drawing Sheets

PHOTOSENSITIVE SHEET REMAINING AMOUNT DETECTION DEVICE FOR IMAGE FORMING APPARATUS

This application is a continuation of application Ser. No. 07/486,364 filed on Feb. 28, 1990, now abandoned.

FIELD OF THE INVENTION

The present invention relates to an image forming apparatus which forms a latent image on a portion of a photosensitive sheet successively drawn from a photosensitive sheet roll, and then forms a visible image on an image receiving sheet derived from the latent image by image forming processing, and more specifically to a remaining amount detection device for unused photosensitive sheet for use in the apparatus.

BACKGROUND OF THE INVENTION

An image forming apparatus employing a photosensitive sheet as a photosensitive-pressuresensitive type medium forms a latent image on a portion of a photosensitive sheet successively drawn from a photosensitive sheet roll, and by depressing the latent image bearing portion onto an image receiving sheet, forms a visible image on the image receiving sheet. Therefore, the portion of the photosensitive sheet after having been depressed onto the image receiving sheet is successively taken up for withdrawal since micro-capsules, which contain a dye intermediate and photosensitive substances therein and are coated on the photosensitive sheet, have been already used. Accordingly, in the above image forming apparatus, it is always necessary to recognize the remaining amount of the photosensitive sheet and display it so that the exchange of the photosensitive sheet roll may be made promptly when the sheet has been used up. Conventionally, those remaining amount detection devices have been developed as a device for detecting the amount of unused photosensitive sheet remaining in the photosensitive sheet roll, which are published in the following Japanese official gazettes:

For example, in a remaining amount detection device cited in Publication for Unexamined Utility Model Application No. 54-112986, a mark composed of magnetic substance or the like is predeterminately applied to the rear edge of a sheet which is wound up into a roll and for example, a magnetic detector is employed to detect and indicate the rear edge.

Moreover, in a remaining amount detection device cited in Application No. 55-143246, the remaining amount is shown by measuring the weight of the sheet roll by utilizing the fact that the sheet roll weight decreases accompanying the drawing of the sheet.

Furthermore, in a remaining amount detection device cited in Application No. 57-115036, by utilizing the fact that the diameter of a sheet roll gets smaller accompanying the drawing of the sheet, an actuator is depressed onto the circumference surface of the sheet roll, and thereby the remaining amount of the sheet is indicated according to the displacement of the actuator.

However, the remaining amount detection device cited in the above Application No. 54-112986 has a problem in that since the rear edge of the sheet is not detected until the sheet roll has been completely used up, the user do not notice the shortage of the sheet beforehand.

In the remaining amount detection device cited in the above Application No. 55-143246, it is difficult for the device to measure the accurate weight while supporting the sheet roll in a simple structure and permitting it to rotate freely. Besides, a smooth drawing of the sheet might be disturbed by supporting members for the sheet roll, and therefore the surface of the sheet might have scratches or specks. Especially in the case of photosensitive sheet as a photosensitive-pressuresensitive type medium, it is apprehended that micro-capsules containing photosensitive substances or the like therein might be broken. Consequently, it has a problem in that those scratches or specks might cause bad influence on the quality of images.

Moreover, in the remaining amount detection device cited in the above Application No. 57-115036, since the actuator is always depressed onto the surface of the photosensitive sheet at the outermost circumference of its roll, the depression might cause scratches or specks on the photosensitive sheet or the like in the same way as is described above.

SUMMARY OF THE INVENTION

It is an object of the present invention to provide a remaining amount detection device for a photosensitive sheet for use in an image forming apparatus, which may always detect the remaining amount of the photosensitive sheet accurately and display it without causing any scratches or specks on the photosensitive sheet.

In order to achieve the above object, a remaining amount detection device according to the present invention comprises: rotation detection means for detecting the rotation amount of the photosensitive sheet roll; control means which on the one hand measures the rotation amount of the photosensitive sheet, and on the other hand controls image forming processing according to the rotation amount having been measured, and; display means which displays the remaining amount of the photosensitive sheet according to the rotation amount measured by the control means.

Normally in image forming apparatuses, a photosensitive sheet supply amount per unit time is always kept constant so as to simplify the conditions of image formation in the image forming processing. Besides, even in the case of changing the magnifications of latent image formation, generally the photosensitive sheet supply amount is always maintained constant by changing, for example, scanning speed to the document. In the remaining amount detection device according to the present invention, the constant supply amount per unit time for the photosensitive sheet is utilized in order to detect the remaining amount of the photosensitive sheet.

In the above construction, when the photosensitive sheet is successively drawn from the photosensitive sheet roll during the image forming process, the rotation detection means detects the rotation of the photosensitive sheet roll. The control means registers a predetermined period of time during the image forming process. Then, the control means measures the rotation amount of the photosensitive sheet detected by the rotation detection means during the predetermined period of time.

The amount of photosensitive sheet drawn in the predetermined period of time is constant according to the above. In comparison with the constant amount of photosensitive sheet thus drawn, the rotation amount measured by the control means varies depending on the variations of the outside diameter of the photosensitive roll. More specifically, when the remaining amount of the photosensitive sheet is large and, therefore, the outside diameter of the photosensitive sheet roll is big, the rotation amount to draw a predetermined amount of the photosensitive sheet is small. On the other hand, as the remaining amount of the photosensitive sheet becomes smaller and, therefore, the outside diameter of the photosensitive sheet roll becomes smaller, the rotation amount becomes greater. Consequently, if the relation between the rotation amount and the outside diameter of the photosensitive sheet is found beforehand, the remaining amount of the photosensitive sheet may be always obtained accurately according to the rotation amount of the photosensitive sheet roll. The display means displays the remaining amount of the photosensitive sheet thus detected by converting it into a proper physical amount or by making it correspond to the same.

Furthermore, in order to achieve the above object, another remaining amount detection device for a photosensitive sheet for use in an image forming apparatus according to the present invention is further characterized in comprising: control means which on the one hand measures the rotation amount of a photosensitive sheet detected by the rotation detection means during a period from the start to the end of one cycle of image forming process, and on the other hand converts the rotation amount thus measured into a rotation amount in a standard image forming processing.

In an image forming apparatus, image receiving sheets having a plurality of sizes are used, one of which is depressed onto a portion of a photosensitive sheet having a latent image formed thereon in order to form the visible image. When image receiving sheets of a different size are used, the total amount of the photosensitive sheet drawn in one cycle of the image forming processing changes although the amount of the photosensitive sheet drawn per unit time is constant. However, the total amount of the photosensitive sheet drawn is constant depending on each size of image receiving sheets. By making use of the fact, the above another remaining amount detection device may detect the remaining amount of the photosensitive sheet.

According to the above construction, when a photosensitive sheet is successively drawn from a photosensitive sheet roll after the start of an image forming processing, the rotation detection means detects the rotation of the photosensitive sheet roll. Then, the control means measures the rotation amount of the photosensitive sheet detected by the rotation detection means during a period from the start to the end of the image forming processing. The fact that the total amount of the photosensitive sheet drawn in one cycle of the image forming processing is constant depending on each size of image receiving sheets shows that a period of time required for one cycle of the image forming processing is constant depending on each size. Accordingly, if the rotation amount measured by the control means during one cycle of the image forming processing is converted into a rotation amount which is obtained when it is supposed that a standard size of image receiving sheet is used, the converted rotation amount shows a value which uniformly corresponds to the variations of the outside diameter of the photosensitive sheet roll regardless of the sizes of image receiving sheets. The conversion may be performed, for example, by multiplying the measured rotation amount by a coefficient corresponding to the ratio of each size to the standard size of image receiving sheets. In addition, in the image forming apparatus which normally deals with two or more sizes, another detection device is installed in order to constantly detect the size of image receiving sheets to be used.

As a result of the above, the converted rotation amount is small when the remaining amount of photosensitive sheet is great and, therefore, the outside diameter of the photosensitive sheet is big, and it becomes greater when the remaining amount of photosensitive sheet becomes smaller and, therefore, the outside diameter of the photosensitive sheet becomes smaller. If the relation between the outside diameter of the photosensitive sheet roll and the rotation amount can be found in advance in the case of using image receiving sheets of a standard size, the remaining amount of the photosensitive sheet can be constantly detected accurately according to the converted rotation amount. The display means displays the remaining amount of the photosensitive sheet thus detected by converting it into a proper physical amount or making it correspond to the same.

For a fuller understanding of the nature and advantages of the invention, reference should be made to the ensuing detailed description taken in conjunction with the accompanying drawings.

BRIEF DESCRIPTION OF THE DRAWINGS

FIG. 1 is a block diagram showing the construction of a control part in a copying machine.

FIG. 2 is a front view of a copying machine showing its schematic internal structure.

FIG. 3 is a detailed flow chart showing a remaining amount display processing.

FIG. 4 is a flow chart showing operations of a control part in a copying machine.

FIG. 5 is a detailed flow chart showing a remaining amount display processing.

FIG. 6 is a flow chart showing operation of a control part in a copying machine.

DESCRIPTION OF THE EMBODIMENTS

One way of carrying out the present invention is described in detail with reference to FIGS. 1 to 6 as follows.

(a) Entire Structure of Copying Machine

Figure 1:
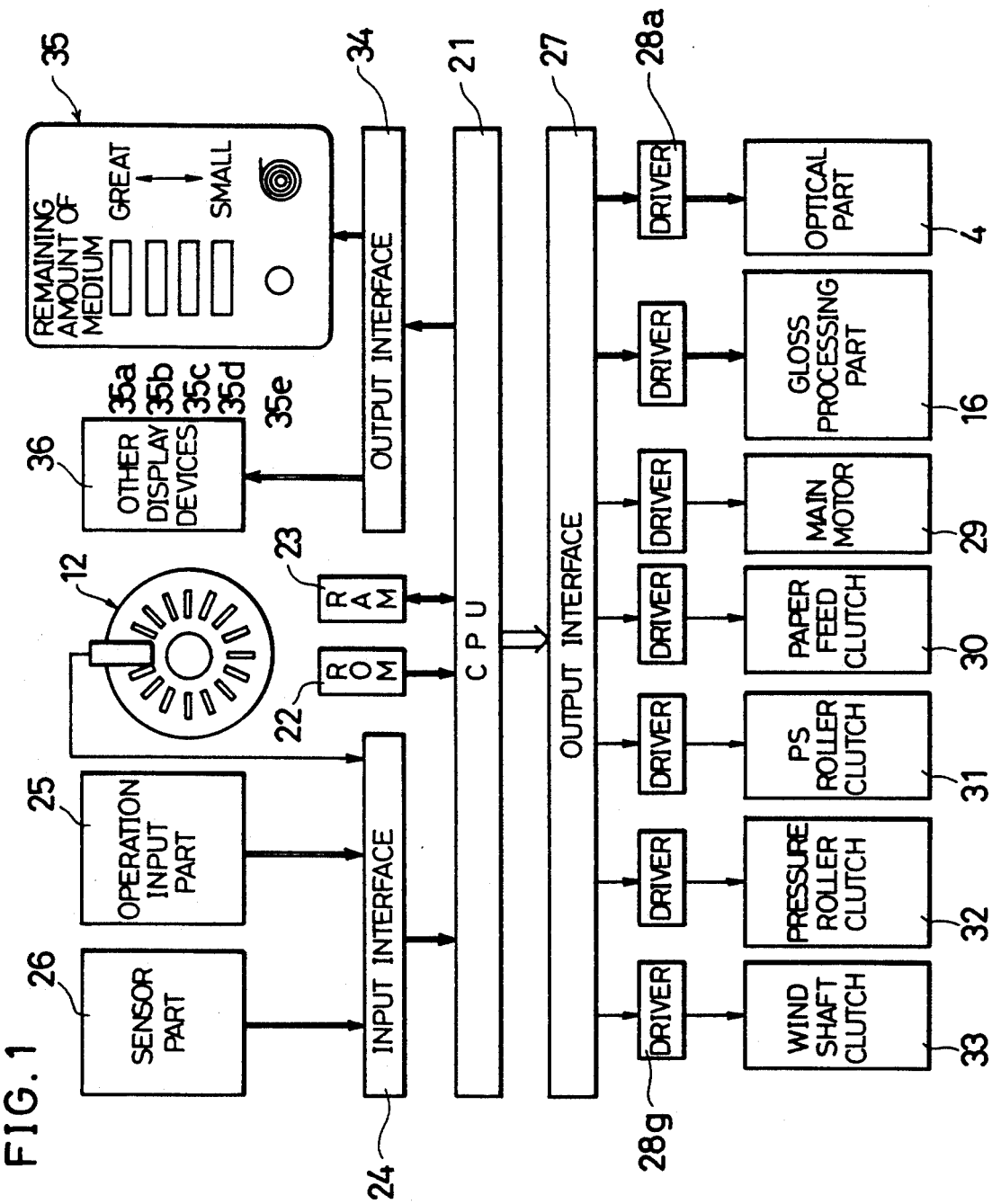
FIGS. 1 to 4 show one way of preferred embodiment of the present invention.
Figure 2:
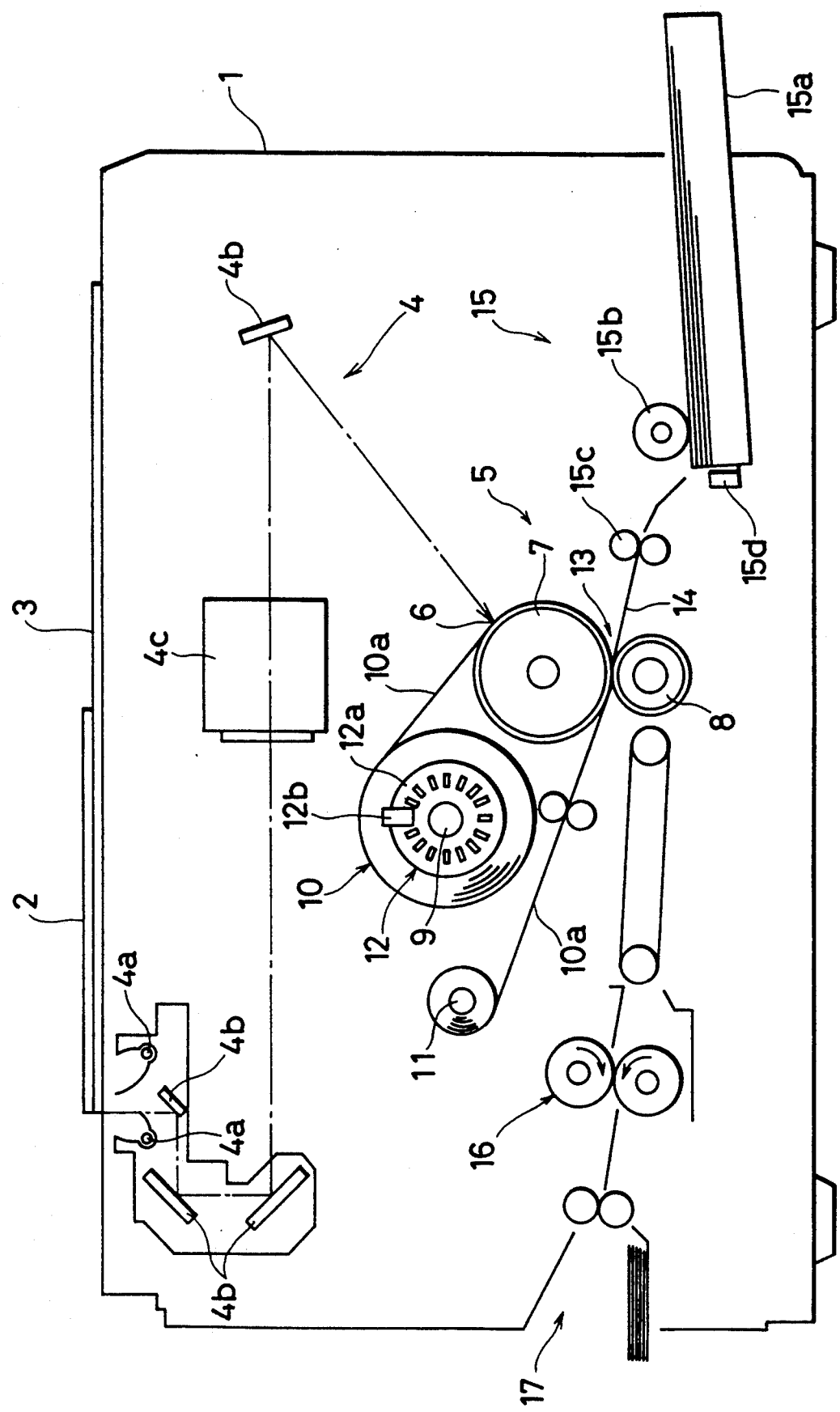

The present embodiment deals with a copying machine shown in FIGS. 1 and 2. The copying machine is an example of image forming apparatuses employing a photosensitive sheet which is a photosensitive-pressuresensitive type medium.

As shown in FIG. 2, on the upper part of a copying machine body 1, there is a document table 3 for placing a document 2 thereon. Under the document table 3, there is installed an image forming processing part 5 having an optical part 4 in between. The optical part 4 comprises a pair of light source lamps 4a, a plurality of reflecting mirrors 4b and a lens 4c. The light source lamps 4a scan the document 2 as is similar to an ordinary optical system shifting type copying machine. Next, the optical image of the document 2 is led to an irradiation part 6 in the image forming processing part 5 through the reflecting mirrors 4b and the lens 4c.

The image forming processing part 5 comprises a main drum 7 which is rotatively driven at a predetermined speed when an image is formed and a pressure roller 8 which rotates accompanying the rotations of the main drum 7. The pressure roller 8 is located under the main drum 7 with their shafts parallel to each other, and is permitted to be releasably depressed onto the main drum 7.

A photosensitive sheet supply shaft 9 is located parallel to the shaft of the main drum 7 diagonally to the upper left of the main drum 7. To the photosensitive sheet supply shaft 9, a photosensitive sheet roll 10 having a photosensitive sheet 10a wound up thereon is fitted, and it is rotatably supported by the shaft 9. Consequently, the photosensitive sheet 10a is drawn from the circumference part of the photosensitive sheet roll 10 diagonally to the lower right of the photosensitive sheet roll 10, and is wound halfway round the main drum 7. Then the photosensitive sheet 10a is wound up by a photosensitive sheet wind shaft 11 at the left side after passing through the main drum 7 and the pressure drum 8. During this step, a backward tension to the drawing direction is applied to the photosensitive sheet 10a by a construction (not shown). Moreover, the photosensitive sheet wind shaft 11 is rotatively driven in the winding direction through a friction member which permits slipping when more than a predetermined amount of torque is applied. Consequently, the photosensitive sheet 10a may maintain a proper tension when it is drawn at a predetermined speed from the photosensitive sheet roll 10 by the rotative drive of the main drum 7 so as to form images thereon, and is wound up around the photosensitive sheet wind shaft 11.

The photosensitive sheet supply shaft 9 also has a rotary encoder 12 fitted thereon as a rotation detector. The rotary encoder 12 comprises a disc 12a having slits formed through it at every predetermined interval on the same circumference and a photo interrupter 12b disposed having the disc 12a in between its light emitting element and light receiving element. The photo interrupter 12b generates light pulses with a predetermined time rate to the rotation cycle of the disc 12a regardless of the rotation direction of the supply shaft 9 as the photosensitive sheet roll 10 rotates together with the photosensitive sheet supply shaft 9. Thus the rotation amount of the photosensitive sheet supply shaft 9 is detected by converting the intensity of the light pulses varying due to the slits of the disc 12a into electric signals.

The above photosensitive sheet 10a serves as a photosensitive-pressuresensitive medium to be used for the image formation. As a concrete example, such a metal sheet as reflects light like aluminum or the like is employed, on the surface of which micro-capsules containing leuco ink as a dye intermediate and photo-hardening substance as a photosensitive substance are coated.

The vicinity of the part from which the photosensitive sheet 10a is started to be wound around the main drum 7 forms an irradiation part 6 on which the optical image is led through the above-mentioned optical part 4. Then the photo-hardening substance contained in the capsules is exposed on the irradiation part 6, and a latent image is formed on a portion of the photosensitive sheet 10a.

On the other hand, the part wherein a portion of the photosensitive sheet 10a wound half around the main drum 7 is depressed by the pressure roller 8 forms a pressure part 13 in the image forming processing part 5.

An image receiving sheet 14 on which developing substances and thermal plastic resins are coated is supplied to the pressure part 13, and the image receiving sheet 14 is depressed on the photosensitive sheet 10a by the pressure roller 8.

In this way, when the photosensitive sheet 10 and the image receiving sheet 14 are simultaneously contacted and depressed with each other in the pressure part 13, the micro-capsules on the photosensitive sheet 10a, which have not been exposed (accordingly not hardened), are ruptured and the leuco ink contained therein reacts on the developing substances, and therefore a visible image is formed on the image receiving sheet 14.

It is a paper feed part 15 located in the right side of the image forming processing part 5 that supplies the image receiving sheets 14 to the pressure part 13. The paper feed part 15 feeds image receiving sheets 14, many of which are kept in a paper feed cassette 15a, to a PS roller (paper stopper roller) 15c one by one by the action of a paper feed roller 15b. The PS roller 15c supplies the image receiving sheets 14 to the pressure part 13 with a predetermined timing. Moreover, to the leading edge of the paper feed cassette 15a, is secured a sheet size detector 15d for detecting the size of the image receiving sheets 14 stored in the paper feed cassette 15a.

The image receiving sheet 14 which has passed through the pressure part 13 is ejected into a paper ejection part 17 after being processed in a gloss processing part 16. In the gloss processing part 16, the image receiving sheet 14 is heated by a heat roller so that the thermal plastic resin coated thereon may be melted. Thus the image receiving sheet 14 having the image formed thereon obtains gloss on its surface.

(b) Structure of Control Part

In the photosensitive sheet remaining amount detection device in accordance with the present invention, it is possible to compose its control means by the use of, for example, micro-computers.

The following description deals with the construction of the control part of the above-mentioned copying machine referring to FIG. 1.

The copying machine is controlled by CPU 21 (Central Processing Unit). The CPU 21 performs control operations while using RAM 23 as a work area for reading and storing data therefrom/to according to control programs written in ROM 22.

To the CPU 21, through an input interface 24, are entered signals released from an operation input part 25 and a sensor part 26 as well as the count numbers of pulses according to pulse signals released from the rotary encoder 12. The input interface 24 comprises a counter which counts pulse signals released from the rotary encoder 12 and releases the count number to the CPU 21. The operation input part 25 functions as an input device comprising an operation panel (not shown) of the copying machine which receives operations from the operator. The sensor part 26 comprises a group of various sensors respectively positioned in the apparatus body 1 including the sheet size detector 15d.

The outputs of the CPU 21 are respectively connected to the optical part 4, the gloss processing part 16, a main motor 29, a paper feed clutch 30, a PS roller clutch 31, a pressure roller clutch 32, and a wind shaft clutch 33 through an output interface 27 by the use of respective drivers 28a to 28i.

The main motor 29 functions as a driving power source for various driving parts in the copying machine. The paper feed clutch 30 transmits the rotations of the main motor 29 to the paper feed roller 15b in the paper feed part 15. The PS roller clutch 31 transmits the rotations of the main motor 29 to the PS roller 15c in the paper feed part 15. The pressure roller clutch 32 transmits the rotations of the main motor 29 to the main drum 7. The wind shaft clutch 33 transmits the rotations of the main motor 29 to the photosensitive sheet wind shaft 11.

Moreover, the outputs of the CPU 21 are connected to a remaining amount display device 35 and other display devices 36 through an output interface 34. The remaining amount display device 35 is installed in the operation panel of the copying machine, and comprises four remaining amount indicator lamps 35a to 35d as well as an exchange indicator lamp 35e. These four remaining amount indicator lamps 35a to 35d indicate the remaining amount of the photosensitive sheet 10a by the number of the lights on. The exchange indicator lamp 35e indicates the necessity of exchanging the photosensitive sheet roll 10 by turning on and off when the amount of photosensitive sheet 10a gets small. The other display devices 36 are installed in the operation panel of the copying machine so as to perform various indications besides those for the remaining amount of the photosensitive sheet 10a.

(c) Operations of Control Part (1)

Figure 3:
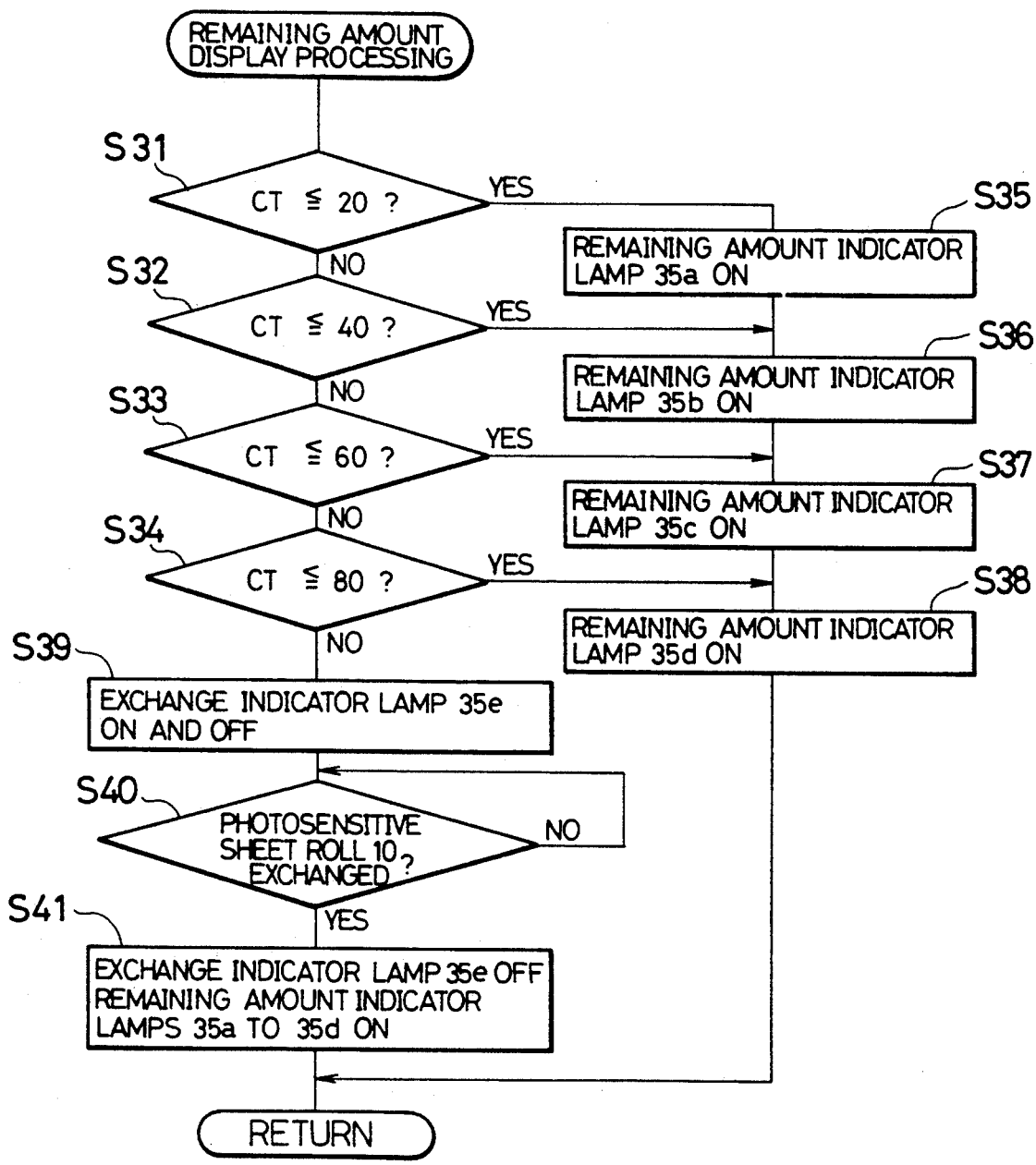
Figure 4:
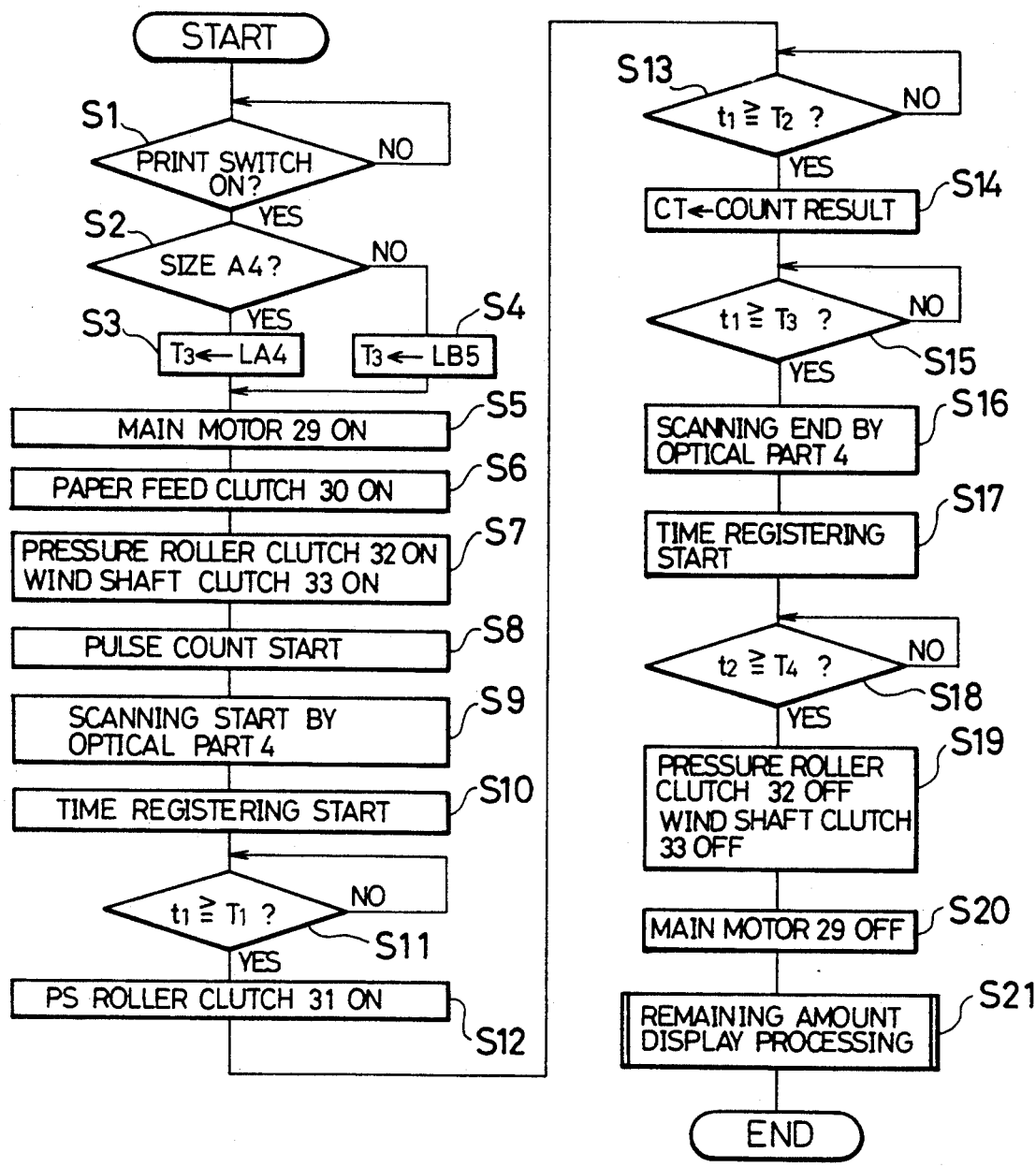

An example of operations is shown with respect to the control part of a copying machine having the above construction referring to flow charts in FIGS. 3 and 4.

As shown in FIG. 4, at first a copying process is initiated when a print switch (not shown) is pressed in the operation input part 25 by the operator at Step 1 (hereinafter given as numbers preceded by S). Next, the size of image receiving sheets 14 kept in the paper feed cassette 15a is recognized according to the output from the sheet size detector 15d in the sensor part 26 (S2). In the case of the copying machine which deals with the sheets of paper, for example, of sizes A4 and B5, at first it is recognized whether the size of the image receiving sheets 14 is A4 or not. Then, if the size of the image receiving sheets 14 is not A4, the size is recognized as B5.

When the size of the image receiving sheets 14 is recognized as A4, a constant LA4, which will be described later, is stored in a fixed area preset on the RAM 23 as a period variable $T_3$ (S3). When the size of the image receiving sheets 14 is recognized as B5, a constant LB5, which will be described later, is stored in the same area as a period variable $T_3$ (S4). The constant LA4 as well as LB5 is a value which shows the transport time determined according to each length in the transport direction of the respective image receiving sheets 14 of size A4 or B5, and is predeterminately stored in the ROM 22.

Next, simultaneously as the main motor 29 is driven (S5), the paper feed clutch 30 is actuated to transmit the rotations of the main motor 29 to the paper feed roller 15b. Consequently, one of the image receiving sheets 14 kept in the paper feed cassette 15a is fed (S6). Besides, the image receiving sheet 14 fed at S6 stops at the PS roller 15c for a certain period of time.

On the other hand, simultaneously as the main motor 29 is actuated to drive, the pressure roller clutch 32 and the wind shaft clutch 33 are also actuated to transmit the rotations to the main drum 7 and the photosensitive sheet wind shaft 11. Consequently, a photosensitive sheet 10a is drawn from the photosensitive sheet roll 10 (S7). When the drawing of the photosensitive sheet 10a is initiated, light pulse emission in the rotary encoder 12 is also started accompanying the rotations of the photosensitive sheet supply shaft 9. Next, the counter of the input interface 24 starts counting pulse signals which have been converted into electric signals by the photo interrupter 12b (S8). Furthermore, when the drawing of the photosensitive sheet 10a is initiated, scanning to the document 2 is started by the optical part 4 (S9), and simultaneously as a latent image is formed on the photosensitive sheet 10a at the irradiation part 6, time registering is started (S10).

When the time registering is started, a registered time $t_1$ as a variable and a period constant $T_1$ preset in ROM 22 are compared with each other (S11). The image receiving sheet 14 is held in a stand-by state at the PS roller 15c until the registered time $t_1$ reaches the period constant $T_1$. This is because it is necessary to make both of the leading edge of the latent image formed on the photosensitive sheet 10a at the irradiation part 6 and the same of the image receiving sheet 14 to reach the pressure part 13 at the same time. The value of the period constant $T_1$ is, more concretely, preset so that it may become equal to a period of time required for the photosensitive sheet 10a, which is wound onto the main drum 7, to be transferred to a fixed position on a way from the irradiation part 6 to the pressure part 13.

When the registered time $t_1$ becomes equal to the value of the period constant $T_1$, the PS roller clutch 31 is actuated to transmit the rotations to the PS roller 15c. Consequently, the image receiving sheet 14, which has stopped for a certain period of time, is transferred by the PS roller 15c and fed to the pressure part 13 in the image forming processing part 5 (S12).

When the PS roller clutch 31 is actuated, the registered time $t_1$ is compared with a period constant $T_2$ which is predeterminately stored in the ROM 22 (S13). The value of the period constant $T_2$ is preset as a fixed figure between the value of the period constant $T_1$ and that of the aforementioned period variable $T_3$. When the registered time $t_1$ reaches the value of the period constant $T_2$, a count value for the pulse signals by the counter of the input interface 24 is stored in the area preset on the RAM 23 as a variable CT (S14). More specifically, the count value is expressed as the number of registered light pulses emitted by the rotary encoder 12 during the passage of a predetermined preset time (period constant $T_2$) since the initiation of the drawing of the photosensitive sheet 10a.

Accordingly, as will be described in detail later, since the count value which is stored as the variable CT varies depending on the remaining amount of the photosensitive sheet roll 10, it is utilized for the remaining amount display processing of the photosensitive roll 10.

When the registered time $t_1$ exceeds the value of the period constant $T_2$, it is further compared with the period variable $T_3$ (S15). The value of the period variable $T_3$, as is mentioned above, is equal to a transport time preset according to the length in the transport direction of the image receiving sheet 14 fed thereto. Accordingly, when the registered time $T_1$ becomes equal to the value of the period variable $T_3$, it is noted that the photosensitive sheet 10a is transferred the same distance as the length of the image receiving sheet 14 of the corresponding size. At this point of time, the latent image of the document 2 has been formed on the photosensitive sheet 10a, and therefore the scanning by the optical part 4 is also completed (S16).

However, at this point of time, the rear edge of the latent image on the photosensitive sheet 10a is still at the irradiation part 6. Consequently, time registering is newly started (S17), and the registered time $t_2$ as a variable is compared with a period constant $T_4$ (S18). The value of the period constant $T_4$ is determined so that it may become equal to a period of time required for the rear edge of the latent image on the photosensitive sheet 10a to reach the pressure part 13 from the irradiation part 6. The reason why the new time registering is performed is that since the above period variable $T_3$, that is to say, the period of time required for the formation of a latent image varies depending on the sizes of the photosensitive sheets 14 fed thereto, the start time of comparison between $T_3$ and the period constant $T_4$ also varies. Therefore, the new time registering is necessary so as to perform an accurate comparison.

When the registered time $t_2$ becomes equal to the value of the period constant $T_4$, it is noted that the rear edge of the latent image on the photosensitive sheet 10a and the same of the image receiving sheet 14 are overlapped each other and simultaneously pass through the pressure part 13, and thereby the image formation has been completed. Then, the pressure roller clutch 32 as well as the wind shaft clutch 33 is released from its operation, and therefore the drawing of the photosensitive sheet 10a is stopped (S19). The image receiving sheet 14 is ejected into the paper ejection part 17 after being processed in the gloss processing part 16, and then the main motor 29 is stopped (S20). Finally, the remaining amount display processing of the photosensitive sheet 10a is performed (S21), and thereby all the processes are completed.

The following description deals with the above remaining amount display processing in detail referring to a flow chart in FIG. 3.

In this processing routine, at first the count value, which was stored at S14 in FIG. 4 as a variable CT, is read from the RAM 23 and is successively compared with comparison constants (for example, 20, 40, 60 and 80) which are preset corresponding to the remaining amount of the photosensitive sheet roll 10 (S31 to S34). Then, if the value of the variable CT is the constant 20 or less, all the four remaining amount indicator lamps 35a to 35d on the remaining amount display device 35 are permitted to turn on (S35 to S38). If it is more than 20 but 40 or less, the three remaining amount indicator lamps 35b to 35d are permitted to turn on (S36 to S38). Similarly if it is more than 40 but 60 or less, the two remaining amount indicator lamps 35c to 35d turn on (S37 and 38), and if it is more than 60 but 80 or less, the only one remaining amount indicator lamp 35d turns on (S38). Then in any one of the above cases, when the remaining amount indicator lamp 35d turns on at S38, the control program returns to the main routine shown in FIG. 4.

On the other hand, the count value (the value of the variable CT) corresponds to the counted number of light pulses generated by the rotary encoder 12 during a predetermined period of time (period constant $T_2$). When a remaining amount of the photosensitive sheet 10a is great, and therefore the outside diameter of the photosensitive sheet roll 10 is big, the angular velocity of the rotations of the photosensitive sheet roll 10, whereby the photosensitive sheet 10a is drawn at a predetermined speed as described before, becomes relatively slower. Consequently, since the rotation amount of the photosensitive sheet roll 10 becomes smaller and therefore the number of light pulses gets fewer, the count value gets smaller. On the other hand, when the remaining amount is small and therefore the outside diameter of the photosensitive sheet roll 10 is small, the angular velocity of the rotations of the photosensitive sheet roll 10 becomes relatively faster. Consequently, since the number of light pulses gets more, the count value gets greater. As described above, by the process according to the count value, the number of the remaining amount indicator lamps 35a to 35d turned on is permitted to correspond to the remaining amount of the photosensitive sheet 10a.

However, if the value of the variable CT is more than the constant 80, it shows that there is only little amount of photosensitive sheet 10a left on the photosensitive sheet roll 10. Accordingly, when it is recognized at S34 that the value of the variable CT is more than the constant 80, the exchange indicator lamp 35e on the remaining amount display device 35 turns on and off (S39), thereby indicating the exchange of the photosensitive sheet 10 (S40). In addition, the comparison constants 20 to 80 are determined so as to have the above relation in their correspondence to the count value stored as the variable CT, and are predeterminately stored in the ROM 22.

When the photosensitive sheet roll 10 is exchanged for a new one, the exchange indicator lamp 35e turns off, and all the four remaining amount indicator lamps 35a to 35d turn on (S41), thereby returning to the main routine.

Consequently, in the display processing of remaining amount as is disclosed in the present embodiment, since the remaining amount display device 35 accurately indicates the remaining amount of the photosensitive sheet 10a every time one cycle of image forming processing is completed, the preparation for the exchange of the photosensitive sheet roll 10 can be made appropriately and effectively.

(d) Operations of Control Part (2)

Figure 5:
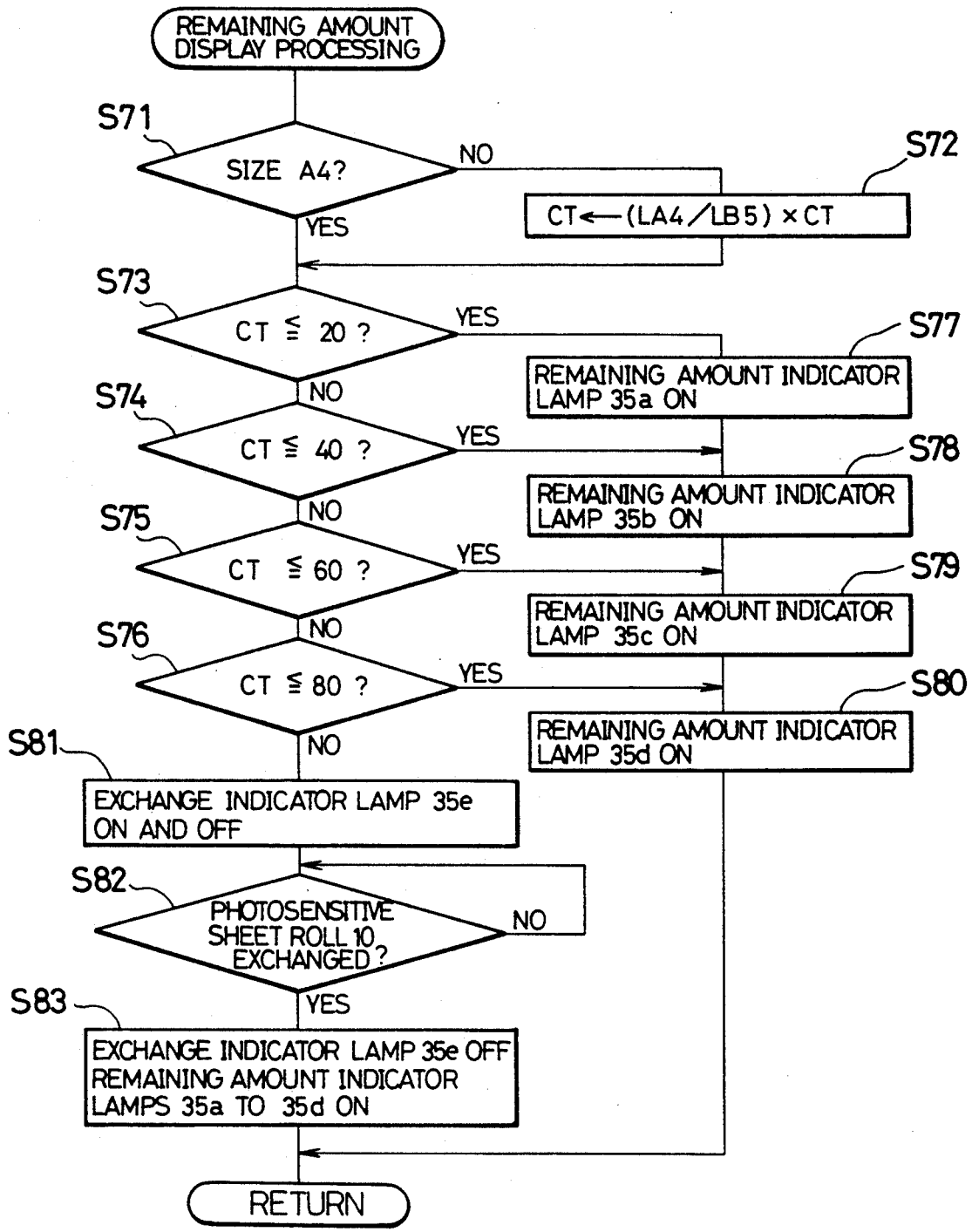
FIGS. 5 and 6 show another way of preferred embodiment of the present invention.
Figure 6:
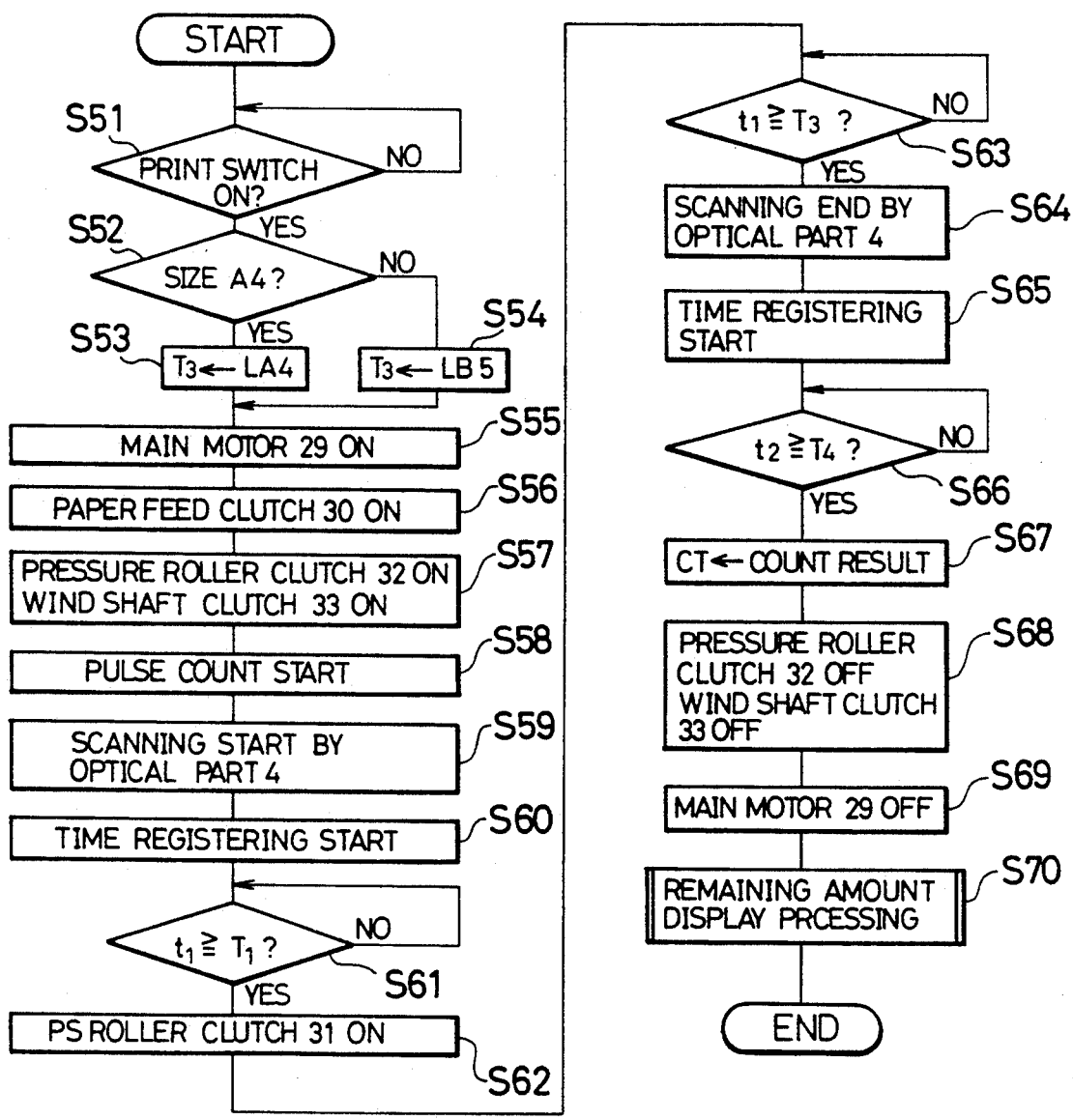

The following description deals with another example of the operations of the control part with respect to a copying machine having the above construction according to flow charts in FIGS. 5 and 6. This embodiment is characterized in that the count value which is used in the remaining amount display processing of the photosensitive sheet 10a is converted into a count value which is obtained in a standard image forming process.

As shown in FIG. 6, at first a copying process is initiated when the print switch is pressed in the operation input part 25 by the operator at Step 51. The processes from S51 to S62 are the same as S1 to S12 shown in FIG. 4. Similar to the aforementioned S3 and S4, at S53 and S54, the constant LA4 or LB5 according to the size of the photosensitive sheet 14 fed thereto is stored in the RAM 23 as a period variable $T_3$. Similar to the aforementioned S8, at S58, when the drawing of the photosensitive sheet 10a is started, the counter in the input interface 24 starts counting pulse signals released from the rotary encoder 12. At S60, time registering is initiated in the same way as the aforementioned S10.

At S62, when the PS roller clutch 31 is actuated, the registered time $t_1$ as a variable is compared with the period variable $T_3$ (S63). The value of the period variable $T_3$, as is described at S3 and S4 in FIG. 4, corresponds to transport time determined according to each length in the transport direction of the image receiving sheets 14 fed thereto. Accordingly, when the registered time $t_1$ becomes equal to the value of the period variable $T_3$, it is noted that the photosensitive sheet 10a has been transported the same distance as the length in the transport direction of the image receiving sheet 14 fed thereto. At this point of time, scanning by the optical part 4 is completed (S64). Besides, in this process, since the processing corresponding to S13 and S14 in FIG. 4 isn't performed, it is not necessary to preset the period constant $T_2$.

When the registered time $t_1$ becomes equal to the value of the period variable $T_3$, new time registering is initiated (S65), and the registered time $t_2$ as a variable is compared with the period constant $T_4$ (S66). When the registered time $t_2$ becomes equal to the period constant $T_4$, the rear edge of a latent image on the photosensitive sheet 10a and that of the image receiving sheet 14 simultaneously pass through the pressure part 13 in face to face contact with each other, and thereby the image formation is completed.

When the image formation is completed, a count value counted according to the output of the rotary encoder 12 is stored in a fixed area preset on the RAM 23 as a variable CT (S67). Accordingly, the count value corresponds to a value obtained by counting the number of light pulses released by the rotary encoder 12 during one cycle of the image formation process period($T_3+T_4$; it is referred to as a period from the start of a latent image formation on the photosensitive sheet 10a until the rear edge of the latent image reaches the pressure part 13 together with the rear edge of the image receiving sheet 14).

However, the period variable $T_3$ differs depending on the size of the image receiving sheets 14. Still, the total drawing amount of the photosensitive sheet 10a during one cycle of the image formation process is constant according to each size of image receiving sheets 14. In other words, the value of $T_3+T_4$ is constant according to each size of image receiving sheets 14. Moreover, in the copying machine in accordance with the present embodiment, it is supposed that the drawing amount per unit time of the photosensitive sheet 10a should be always constant; however even in any copying machine wherein the drawing amount per unit time differs depending on the size of the image receiving sheets 14, the copying magnifications or the like, the value of $T_3+T_4$ becomes constant according to the size of the image receiving sheets 14 or to the copying magnifications.

Consequently, at first a standard size of the image receiving sheets 14, standard copying magnifications or the like is determined, and then by making the number of registered light pulses to be converted on the basis of the value of $T_3+T_4$ under a given condition, a count value converted according to the remaining amount of the photosensitive sheet 10a may be obtained under any conditions. In the present embodiment, is shown a case wherein the conversion for the number of registered light pulses is performed in a routine in the remaining amount display processing.

When the above count number (have not converted yet) is stored, the pressure roller clutch 32 as well as the wind shaft clutch 33 is stopped in its operation to halt the drawing of the photosensitive sheet 10a (S68), and then the main motor 29 stops (S69). Finally, the remaining amount display processing for the photosensitive sheet 10a is performed (S70), and thereby all the processes are completed.

The following description deals with the above remaining amount display processing in detail referring to a flow chart in FIG. 5.

In this processing routine, at first it is judged whether the size of an image receiving sheet 14 fed thereto is A4 or not (S71). In the case that the size is not A4, that is to say, the size is B5, the count value which was stored at S67 in FIG. 6 is multiplied by the value of a ratio [constant LA4/constant LB5], and then the operation result is stored again in the RAM 23 as a variable CT (S72). As aforementioned, by multiplying the count value obtained at S67 by the value of the ratio [constant LA4/constant LB5] (or by the ratio of size A4 to size B5, since the transport time is directly proportional to the size of image receiving sheets 14), a count value is obtained which is converted into on the basis of the size A4. Consequently, a correction is made on the differences of count results due to the size differences of the image receiving sheets 14, and therefore the converted count result may be dealt on the same basis. Accordingly, it is to be noted that the value of the variable CT after converted into shows a value corresponding to the remaining amount of the photosensitive sheet 10a regardless of the sizes of the image receiving sheets 14.

Next, similar to S31 to 34, the value of the variable CT after having been thus processed is compared with the comparison constants 20 to 80 (S73 to S76). The remaining amount indicator lamps 35a to 35d secured to the remaining amount display device 35 turn on (S77 to S80) according to the comparison result, thereby returning to the main routine. The processes S77 to S80 are the same as the aforementioned processes S35 to S38 in FIG. 3. Consequently, by the above processes, the remaining amount of the photosensitive sheet 10a is shown by the number of the remaining amount indicator lamps 35a to 35d turned on.

On the other hand, when the value of a variable CT exceeds the constant 80 at S76, the exchange indicator lamp 35e starts turning on and off(S81), thereby indicating the exchange of the photosensitive sheet roll 10 (S82). After the exchange of the photosensitive sheet roll 10, the exchange indicator lamp 35e turns off while all the four remaining amount indicator lamps 35a to 35d turn on (S83), thereby returning to the main routine shown in FIG. 6. The processes S81 to 83 are also the same as the processes S39 to 41.

Accordingly, since the remaining amount display device 35 accurately indicates the remaining amount of the photosensitive sheet 10a every time one cycle of image forming processing is completed, the preparation for the exchange of the photosensitive sheet roll 10 can be made appropriately and effectively.

In addition, the explanation is given concerning S73 to 76 by using the same comparison constants as used at S31 to 34 in FIG. 3. However, the count period for which the count value is obtained is the period constant $T_2$ in the embodiment referring to FIG. 3, whereas the count period for the count value in the embodiment referring to FIG. 5 is the period variable $T_3+$the period constant $T_4$. Consequently, since $T_2<T_3+T_4$, the value of the comparison constants at S73 to 76 should be of course preset as greater values in actual processes if the same hardware is employed.

Moreover, in the present embodiment, a case is shown wherein the count value is converted into on the basis of size A4; however another system may be used wherein the values of the comparison constants to be compared with the value of a variable CT is changed according to the size of image receiving sheets 14. For example, when the size of image receiving sheets 14 is B5, a value which is obtained by multiplying the value of each comparison constant for the size A4 as a standard by the value of a ratio [the constant LB5/the constant LA4] (the reciprocal of the aforementioned value of the ratio) represents each comparison constant for the size B5. After all, the two methods differ little from each other; the difference lies in whether the value of a variable CT is converted into on the basis of a standard in the routine for the remaining amount display processing or the value of a comparison constant to be compared with the value of the variable CT has been predeterminately converted into on the basis of a standard and stored in the ROM.

Moreover, as the image forming process of the image forming apparatus according to the present embodiment, any method may be used as long as a photosensitive sheet and image receiving sheets are used therein, and it isn't limited to a method wherein a latent image is formed on a photosensitive sheet as a photosensitive-pressuresensitive type medium on which micro-capsules containing a dye intermediate and photosensitive substances are coated, and the visible image is formed by depressing an image receiving sheet on which developing materials are coated onto the photosensitive sheet.

Furthermore, the latent image may be formed by forming a one-dimensional optical image in the width direction on the photosensitive sheet and then scanning it in the length direction, besides the formation of an optical image on the photosensitive sheet by the entire exposure at one time. The latent image may also be formed by scanning laser spots or the like in the width direction and the length direction.

Furthermore, any kind of rotation detector as well as measuring means may be used as long as it may detect or measure the rotation amount of the photosensitive sheet roll for a predetermined period. As the rotation amount detector, for example, such a device may be adopted wherein the rotation speed of the photosensitive sheet roll is detected, and by successively integrating it for a predetermined registered time or for a predetermined period according to a section of the image forming process, the rotation amount may be detected.

Furthermore, the aforementioned rotation detector may be secured either to the supplying shaft itself to which the photosensitive sheet roll is fitted or to another place in the rotation system rotating together with the supply shaft.

As aforementioned, the remaining amount detection device for the photosensitive sheet according to the present invention is characterized in comprising; rotation detection means which is secured to the rotation system rotatively supporting the photosensitive sheet roll; control means which measures the rotation amount of the photosensitive sheet detected by the rotation detection means for a predetermined time and controls the image forming process according to the rotation amount; and display means which displays the remaining amount of the photosensitive sheet according to the rotation amount measured by the control means.

In image forming apparatuses, since the drawing amount of a photosensitive sheet per unit time is usually kept constant, the remaining amount detection device for the photosensitive sheet of the present invention may always show the remaining amount of the photosensitive sheet accurately even in the cases where there are differences in the sheet thickness or in the number of winding of the photosensitive sheet on condition that the shaft diameter of the photosensitive sheet roll is constant. Besides, even in the case where the shaft diameter isn't constant, the device may display a relative amount which shows whether the remaining amount of the photosensitive sheet is great or small.

Moreover, another remaining amount detection device for a photosensitive sheet for use in an image forming apparatus according to the present invention is further characterized in comprising: control means which measures the rotation amount of a photosensitive sheet detected by the rotation detection means during a period from the start to the end of one cycle of image forming process, and converts the rotation amount thus measured into a rotation amount in a standard image forming processing.

In image forming apparatuses, the total amount of the photosensitive sheet drawn in one cycle of the image forming processing is constant depending on the size of image receiving sheets. The aforementioned another remaining amount detection device for the photosensitive sheet of the present invention, which is constructed as described above, may display an accurate remaining amount regardless of the size of the image receiving sheets even in the cases where there are differences in the sheet thickness or in the number of winding of the photosensitive sheet on condition that the shaft diameter of the photosensitive sheet roll is constant. Besides, the remaining amount detection device may show an accurate remaining amount by setting a proper conversion rate even in the case where it is adopted in an image forming apparatus wherein the drawing amount of the photosensitive sheet per unit time differs depending on the size of the image receiving sheets, copying magnifications or the like. Moreover, even in the case where the shaft diameter isn't constant, the device may display a relative amount which shows whether the remaining amount of the photosensitive sheet is great or small.

Accordingly, the remaining amount detection device for the photosensitive sheet for use in an image forming apparatus with respect to the present invention may always detect and display the remaining amount of the photosensitive sheet accurately without causing any scratches or specks on the photosensitive sheet surface, and it has an effect on that the preparation for the exchange of the photosensitive roll can be made appropriately and effectively.

The invention being thus described, it may be obvious that the same may be varied in many ways. Such variations are not to be regarded as a departure from the scope of the invention.

There are described above novel features which the skilled man will appreciate give rise to advantages. These are each independent aspects of the invention to be covered by the present application, irrespective of whether or not they are included within the scope of the following claims.

What is claimed is:

1. A photosensitive sheet remaining amount detection device for use in an image forming apparatus, comprising:

a rotation system for rotatively supporting a photosensitive sheet roll and drawing the photosensitive sheet from the sheet roll by a constant amount within a predetermined time period;

rotation detection means for detecting a rotation amount of the photosensitive sheet roll, which is secured to said rotation system;

control means for measuring the rotation amount of the photosensitive sheet roll detected by the rotation detection means within a predetermined period, and for controlling an image forming process, and indicating means for indicating the remaining amount of the photosensitive sheet in the roll according to the rotation amount measured by the control means.

2. A photosensitive sheet amount detection device for use in an image forming apparatus, as claimed in claim 1, wherein said indicating means is a display means.

3. A photosensitive sheet remaining amount detection device for use in an image forming apparatus as claimed in claim 1, wherein the control means comprises:

time registering means for registering time for a predetermined period in the image forming processing, and;

measuring means for measuring the rotation amount of the photosensitive sheet roll, which is detected by the rotation detection means, within a predetermined period registered by the time registering means.

4. A photosensitive sheet remaining amount detection device for use in an image forming apparatus as claimed in claim 3, wherein the control means further comprises:

memory means which stores the rotation amount of the photosensitive sheet roll measured by the measuring means and various constants for controlling the image forming process;

comparison means which compares the rotation amount of the photosensitive sheet roll stored in the memory means with the various constants so as to control the image forming process.

5. A photosensitive sheet remaining amount detection device for use in an image forming apparatus as claimed in claim 3, wherein the indicating means comprises:

a plurality of indicating amount means for indicating the remaining amount of the photosensitive sheet roll, by converting the remaining amount into a predetermined corresponding physical amount;

exchange indication means for indicating the necessity of exchanging of the photosensitive sheet roll when the remaining amount is a predetermined amount or less.

6. A photosensitive sheet remaining amount detection device for use in an image forming apparatus, as claimed in claim 5, wherein the remaining amount indicating means includes, remaining amount indicator lamps which indicate the remaining amount of the photosensitive sheet by the number of lamps turned on.

7. A photosensitive sheet remaining amount detection device for use in an image forming apparatus as claimed in claim 6, wherein the exchange indication means forms an exchange indicator lamp which indicate the necessity of exchange the photosensitive sheet roll exchanging, by turning on and off.

8. A photosensitive sheet remaining amount detection device for use in an image forming apparatus as claimed in claim 7, wherein the plurality of the remaining amount indicator lamps include a specific remaining amount indicator lamp which always turns on at any one of remaining amount indicating steps when showing the remaining amount of the photosensitive sheet by the number of the lamps turned on.

9. A photosensitive sheet remaining amount detection device for use in an image forming apparatus as claimed in claim 4, wherein the time registering means, measuring means, memory means, and comparison means are composed of micro-computer systems including ROM, RAM, input/output interfaces, and CPU.

10. A photosensitive sheet remaining amount detection device for use in an image forming apparatus as claimed in claim 1, wherein the control means comprises measuring means which measures the rotation amount of the photosensitive sheet detected by the rotation detection means during a period from the start of one cycle of the image forming process until the end thereof.

11. A photosensitive sheet remaining amount detection device for use in an image forming apparatus as claimed in claim 10, wherein the indicating means is constructed so as to indicate the remaining amount of the photosensitive sheet according to the rotation amount measured by the measuring means as well as to the size of the image receiving sheets.

12. A photosensitive sheet remaining amount detection device for use in an image forming apparatus as claimed in claim 11, wherein the control means further comprises:

time registering means which registers time during a predetermined period in the image forming process;

conversion means which converts the rotation amount of photosensitive sheet roll measured by the measuring means into a rotation amount in a standard image forming process wherein a latent image is formed in standard copying magnifications on the photosensitive sheet and the visible image is formed on an image receiving sheet of a standard size;

memory means which stores the rotation amount of the photosensitive sheet measured by the measuring means, the rotation amount converted by the conversion means and various constants for controlling the image forming process, and;

comparison means which compares the rotation amount of the photosensitive sheet roll stored in the memory means with the various constants in order to control the image forming process.

13. A photosensitive sheet remaining amount detection device for use in an image forming apparatus as claimed in claim 12, wherein the indicating means is constructed so as to indicate the remaining amount of the photosensitive sheet according to the rotation amount of the photosensitive sheet converted by the conversion means.

14. A photosensitive sheet remaining amount detection device for use in an image forming apparatus as claimed in claim 13, wherein the indicating means comprises:

a plurality of remaining amount means for indicating the remaining amount of the photosensitive sheet roll by converting the amount into a predetermined physical amount corresponding thereto and;

exchange indicating means for indicating the necessity of the exchange of the photosensitive sheet roll when the remaining amount thereof is a predetermined amount or less.

15. A photosensitive sheet remaining amount detection device for use in an image forming apparatus as claimed in claim 14, the remaining amount indicating means form remaining amount indicator lamps which indicate the remaining amount of the photosensitive sheet by the number of lamps turned on.

16. A photosensitive sheet remaining amount detection device for use in an image forming apparatus as claimed in claim 15, wherein the exchange indication means forms an exchange indicator lamp which indicates the necessity of the exchange of the photosensitive sheet roll by turning on and off.

17. A photosensitive sheet remaining amount detection device for use in an image forming apparatus as claimed in claim 16, wherein the plurality of remaining amount indicator lamps include a specific remaining amount indicator lamp which always turns on at any one of remaining amount display steps when showing the remaining amount of the photosensitive sheet by the number of lamps turned on.

18. A photosensitive sheet remaining amount detection device for use in an image forming apparatus as claimed in claim 17 which further comprises sheet size detection means which detects the size of image receiving sheets fed to the pressure part.

19. A photosensitive sheet remaining amount detection device for use in an image forming apparatus as defined in claim 12, wherein the time registering means, measuring means, conversion means, memory means, and comparison means are composed of micro-computer systems including ROM, RAM, input/output interfaces, and CPU.

20. A method for measuring rotation of a photosensitive sheet roll used in an image forming apparatus comprising the steps of:
(a) measuring, by counting, the amount of rotation of a photosensitive sheet roll according to an output released from a rotation detection device when the drawing of the photosensitive sheet starts;
(b) registering time, for a predetermined period, simultaneously with formation of a latent image on a portion of the photosensitive sheet roll, during the time the rotation is measured in step (a)
(c) comparing the time registered in step (b) with a constant preset period constant ($T_2$) in memory; and
(d) storing the amount from step (a) in a preset area in a memory as a variable (CT) when the registered time becomes equal to the value of the period constant ($T_2$).

21. The detection method as claimed in claim 20 further comprising the step of:
determining the value of the period constant $T_2$ as a value between a value of a constant L, which is preset in the memory as a transport time according to the length in a transport direction of an image receiving sheet fed thereto and a period constant T which corresponds to a predetermined time required for the photosensitive sheet to reach a fixed position on a way to a pressure part for forming visible images from an irradiation part and is preset in the memory means in order to hold the image receiving sheet in a stand-by state for a period of time so that the leading edge thereof and the leading edge of a latent image portion on the photosensitive sheet may reach the pressure part at the same time.

22. The detection method as claimed in claim 21, further comprising the steps of:

indicating a remaining amount of the photosensitive sheet after one cycle of image forming process is completed, which is when a rear edge of a latent image on the photosensitive sheet and that of the image receiving sheet simultaneously pass through the pressure part by:
comparing the value of the variable CT with a plurality of comparison constants preset in the memory according to the remaining amount of the photosensitive sheet;
turning on and off exchange indicator lamps when the variable CT exceeds a maximum value given by the largest of the constants, to indicate the exchange of the photosensitive sheet roll;
returning the process to a main routine after a specific remaining amount indicator lamp turns on at respective steps wherein the comparing was successively made with the plurality of the comparison constants, and;
exchanging the sheet roll for a new one, the exchange indicator lamp turn off and all remaining amount indicator lamps turn on, thereby returning to the main routine.

23. A method for measuring the rotation of a photosensitive sheet roll so that the amount remaining in the photosensitive sheet roll can be indicated comprising the steps of:
(a) detecting and recognizing the size of an image receiving sheet;
(b) reading from memory and a constant (L) representing a transport direction of an image receiving sheet;
(c) storing the constant (L) in a fixed area of a memory means as a period variable ($T_3$);
(d) counting a rotation amount of the photosensitive sheet roll according to an output from a detection device after the start of drawing the photosensitive sheet;
(e) registering the time from the start to the end of a formation of a latent image;
(f) comparing the time in step (e) with the value of $T_3$ and when registered time is equal to the value $T_3$;
(g) registering new time until additionally in step (e), from the end of the formation of the image until the rear edge of the latent image reaches a pressure part;
(h) comparing the newly registered time with a preset constant ($T_4$) in memory, which constant represents a period of time required for the rear edge of the photosensitive sheet to reach the pressure part from an irradiation part; and
(i) storing the amount of rotation of the photosensitive sheet roll in a fixed area in a memory as a variable Ct when the registered time becomes equal to $T_4$.

24. A method as claimed in claim 23, further comprising the step of:
indicating the remaining amount of the photosensitive sheet on the roll after one cycle of image forming process completed, which is when a rear edge of a latent image on the photosensitive sheet and that of an image receiving sheet simultaneously pass through a pressure part for forming a visible image.

25. The method of claim 24, further comprising the steps of:
recognizing the size of the image receiving sheet;

multiplying the value of a ratio defined as the constant L for image receiving sheets of a standard size/constant L for image receiving sheets fed to the pressure part by the value of variable Ct to obtain a converted count value and storing the new value as variable Ct';

comparing variable Ct' with a plurality of preset comparison constants in memory according to the remaining amount of photosensitive sheets;

turning on and off an exchange indicator lamp when CT' exceeds the largest maximum value of the preset constants;

returning the process to a main routine, after a specified remaining indicator lamp is turned off; and turning the indicator lamp off and all remaining amount indicator lamps on after the photosensitive sheet roll has been replaced by a new photosensitive sheet roll thereby returning to the main routine.

26. The method of claim 24 further comprising the steps of:

multiplying comparison constants of a standard size sheet by the value of a ratio defined as transport time for feeding an image sheet to the pressure part/transport time of a standard size image sheet to obtain a new comparison constant; and comparing the new comparison constant with the variable Ct to indicate the remaining amount of photosensitive sheet.

27. A method of detecting the remaining amount of photosensitive sheet material on a roll for an image apparatus comprising the steps of:

(a) rotatively supporting a photosensitive sheet roll on a rotation system;

(b) drawing the photosensitive sheet from the sheet roll by constant amount within a predetermined time period;

(c) detecting the amount of rotation of the roll on the rotation system that supports the roll;

(d) measuring the rotation of the roll detected within a predetermined period and controlling the image process; and (e) indicating the remaining amount of photosensitive sheet material on the roll in response to the measured rotation of step (d).

* * * * *